Figure 1:
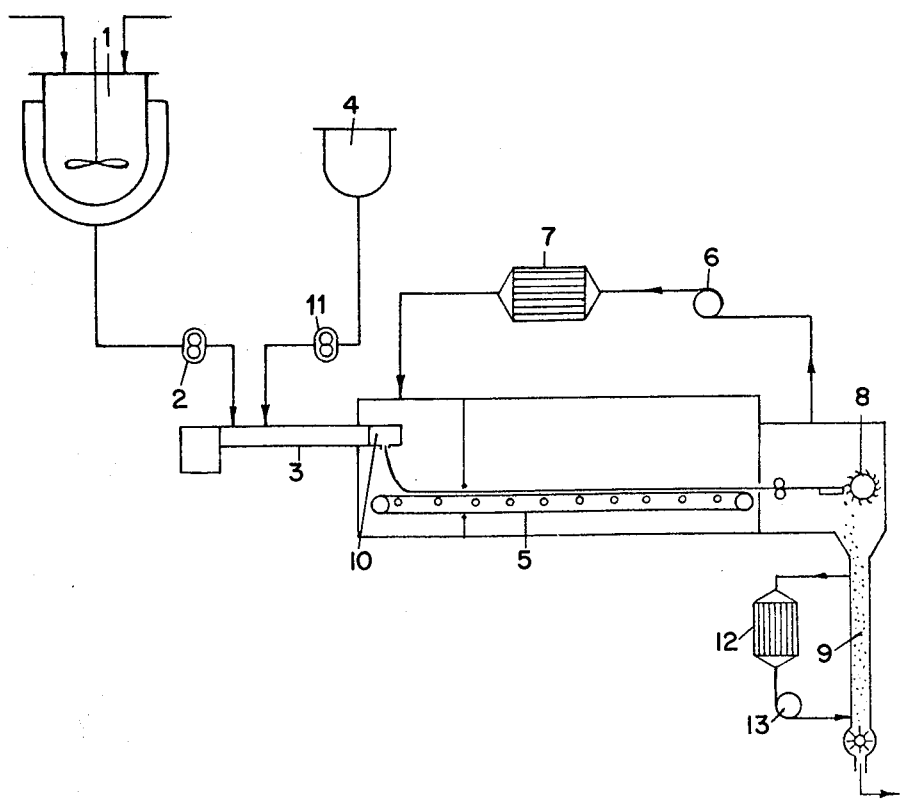

INVENTORS
KENNETH HENRY GEE
PERCY ARTHUR SMALL
BY ERNO LASZLO ZICHY

March 8, 1966 K. H. GEE ETAL 3,239,490
CONTINUOUS ANIONIC POLYMERISATION OF LACTAMS
Filed June 7, 1962 2 Sheets-Sheet 2

INVENTORS
KENNETH HENRY GEE
PERCY ARTHUR SMALL
BY ERNO LASZLO ZICHY

Cushman, Darby & Cushman
ATTORNEYS

United States Patent Office 3,239,490
Patented Mar. 8, 1966

3,239,490
CONTINUOUS ANIONIC POLYMERISATION OF LACTAMS
Kenneth Henry Gee, St. Albans, and Percy Arthur Small and Erno Laszlo Zichy, Welwyn Garden City, England, assignors to Imperial Chemical Industries Limited, London, England, a corporation of Great Britain
Filed June 7, 1962, Ser. No. 200,781
Claims priority, application Great Britain, June 7, 1961, 20,577/61
8 Claims. (Cl. 260—78)

This invention relates to a continuous polymerisation process for the production of polyamides from lactams.

It has previously been proposed to polymerise monomeric lactams by maintaining them at an elevated temperature in the presence of an alkali or an alkaline earth metal, or an alkaline-reacting compound thereof, together with a compound capable of accelerating the alkaline polymerisation reaction. Suitable polymerisation temperatures that have been mentioned are e.g. 220–260° C., in the case of caprolactam, whereby the resulting polymer is produced in the molten condition. When a graph is drawn plotting the viscosity of the mixture subjected to such polymerisation conditions (ordinate) against time (abscissa), the curve shows a maximum at a relatively early stage of the reaction after which the viscosity falls off relatively sharply at first and then more gradually. This viscosity peak is normally quite pronounced and easily identifiable. The polymers obtained by the processes previously proposed, and referred to above, are normally quenched from the melt and the quenched polymers contain such a high proportion of monomeric material which is in equilibrium with the polymer at the temperature at which polymerisation is terminated that they are not wholly satisfactory for use in moulding and extrusion applications.

It is an object of the prevent invention to provide a continuous process for the alkaline polymerisation of monomeric lactams. A particular object of this invention is to provide such a process which results in the production of polymers having low monomer contents which are particularly suitable for use in moulding and extrusion applications. By "low monomer contents" we means monomer contents of less than 1% by weight of the composition. We prefer the monomer contents to be less than 0.5% by weight of the composition.

According to the present invention we provide a process for the production of polyamides which comprises carrying out the following steps in a continuous manner: heating a mixture of at least one monomeric lactam having at least six carbon atoms in the ring with an alkaline polymerisation catalyst and a catalyst promoter at a temperature above the melting point of the polymer of said lactam, extruding through a die the product obtained by heating said mixture when its viscosity is at or near its maximum value, cooling the extrudate to a temperature below said melting point and maintaining the cooled extrudate at a temperature that is between 60° and 15° C. below said melting point (hereinafter and in the appended claims referred to as the post-polymerisation temperature) for a period of time which is at least sufficient to cause the polymer formed to become non-tacky. By "at or near its maximum value" we mean hereinafter and in the appended claims that $\log_{10}\eta \not< (\log_{10}\eta_{max} - 0.5)$. It will be appreciated that unless a particularly powerful extruder is available it may be difficult to extrude at the viscosity maximum.

We prefer to carry out the first step in our process by introducing a molten mixture of said monomeric lactam or lactams with alkaline polymerisation catalyst and catalyst promoter into a screw extruder terminating in a die having a restricted orifice, applying heat to said mixture in said extruder and said die whereby its temperature is raised above the melting point of the polymer of said lactam, and removing the product thereby produced from said orifice when its viscosity is at or near its maximum value. Particularly suitable extrusion temperatures for use in the production of polycaprolactam are 230–280° C., preferably 240–260° C.

The extruder should be provided with a vent in the die head to prevent pressure build-up when filling the extruder and also to indicate when the extruder is full. An inert gas purge point is preferably present at the feed end of the extruder barrel to provide an inert gas seal. The die head vent should be fitted with a non-return device to prevent admission of air.

The extruder die may be valved, or if a plug of polymer remains in the die head from a previous run this may be used to prevent escape of molten monomer from the die when filling.

Molten lactam, catalyst and catalyst promoter are now added with the vent open, after purging the barrel with inert gas in order to remove air and moisture. When the extruder is full, the vent is closed. After a period of e.g. four minutes, the drive is started and the valve (if present) opened.

Extrusion now begins, and the extrudate in lace form travels through the cooler to the post-polymerisation zone.

At this stage, it is necessary to adjust the speed of the screw to give a dwell time in the extruder corresponding to a viscosity at or near the maximum.

The necessary dwell time of a particular mixture fed to the extruder for a given temperature of the melt in the die may be found by simple experimentation, and the speed of rotation of the screw, and/or other variables affecting the throughput of the extruder, such as the dimensions of the die or the back pressure generated therein, selected accordingly. For instance, a sample of the mixture may be maintained at the temperature of the melt in the die while it is kept in the apparatus for determining melt flow index specified in British Standard 2782, Pt. I, 1956, Method 105C, and its change in melt viscosity determined over a period of time by measuring the displacement of the piston therein. By plotting the viscosity against time, the dwell time necessary for the mixture to achieve its maximum viscosity may be determined.

The total time needed to obtain polymer of low monomer content, e.g. equilibrium polymer, from monomer, consists of the dwell time in the extruder and die plus the time for post-polymerisation. For caprolactam, using a die temperature of 230–280° C. and a post-polymerisation temperature of 150–190° C., and continuing post-polymerisation until equilibrium polymer is obtained, this total time is about 30–45 minutes.

We prefer that the dwell time of the polymer in the extruder and die should be so adjusted that it does not exceed 20% and more particularly does not exceed 10% of the total time required to produce equilibrium polymer.

As an alternative to the use of a polythene grader for determining optimum dwell time, if the extruder is sufficiently powerful extrusion may be carried out with an initially low extrusion pressure, the pressure being steadily raised until the maximum die pressure is recorded, any increase or decrease of screw speed at this point leading to a decrease in die pressure or to instability. This method is however less convenient owing to its sensitivity to variations in die temperature.

Once the dwell time for a particular die temperature has been determined using a polythene grader, the extruder screw speed necessary to achieve this may be simply determined by adding monomer melt coloured with a suitable inert dye or pigment to the extruder (initially filled with polymerisation mixture which has reached a steady state as indicated, for example, by constant die pressure), and observing and recording the time taken for the colour to appear in the extrudate. It may be necessary to repeat the tests at different screw speeds until the time for the colour to emerge corresponds with the dwell time desired. It will be understood that the extruder should be purged between tests by feeding uncoloured monomer until the colour of the extrudate is so faint that it will not obscure the emergence of the next colour peak. Before starting the main polymerisation, a further purge may be sufficient to remove colouring matter; alternatively the extruder may be stopped, stripped and cleaned, depending upon the nature of the colouring matter and the quality of product desired. It will be further understood that when the screw speed is finally set it may take some time for the system to settle down and that the polymer initially obtained will not necessarily be characteristic of that obtained under steady conditions.

The cooling step in our process is conveniently effected by withdrawing the extrudate into an inert fluid, e.g. an inert gas, particularly carbon dioxide or nitrogen, maintained at a temperature lower than the melting point of the polymer. Since, in the next (post-polymerisation) step in our process, the extrudate is maintained at a temperature not more than 60° C. below the said melting point, it is preferable for economic reasons not to allow its temperature to fall to a temperature lower than 60° C. below said melting point during the cooling step, and this may be conveniently achieved by allowing the hot inert gas atmosphere used in the post-polymerisation to extend back to the extruder die.

The cooled extrudate is thereafter maintained at the post-polymerisation temperature for a time at least sufficient to convert the polymer into a non-tacky state. This normally corresponds to the onset of opacity in the polymeric extrudate. Preferred post-polymerisation temperatures are between 45° and 25° C. below the polymer melting point in order to obtain reasonably fast reaction rates in combination with low residual monomer contents in the polymer. A very convenient way of carrying out the post-polymerisation is to remove the cooled extrudate by means of a conveyor in an atmosphere of inert gas heated to the appropriate temperature. The conveyor may be in the form of a moving band or belt or, alternatively, a rotating cylinder. Roller conveyors, skew rollers or festoons may also be used. Very conveniently a band or belt of flexible steel, or glass cloth coated with polytetrafluoroethylene is used.

When monomeric lactams are subjected to alkaline polymerisation, the polymers formed become non-tacky at a stage before they are converted into polymers known in the art as equilibrium polymers, that is to say, polymers that do not undergo a reduction in their melt viscosity under normal shaping conditions. Equilibrium polymers are necessary for consistently obtaining shaped articles with reproducible properties therefrom. Accordingly, in order to obtain the most useful mouldable and extrudable polyamides by utilising the process of the present invention we prefer to maintain the cooled extrudate at the post-polymerisation temperature until equilibrium polymer is produced. If desired, the non-tacky polymer first obtained may be disintegrated into particles of a suitable size for feeding to injection moulding and extrusion machines before the rest of the post-polymerisation treatment necessary to produce equilibrium polymer is applied. By this means the time that the polymer is in contact with the conveyor may be reduced to e.g. 10 to 15 minutes, thereby reducing the size of the conveyor which is required. Alternatively, the post-polymerisation of the cooled extrudate may be continued until equilibrium polymer is produced and the latter subjected to disintegration to give a moulding composition. Preferably the disintegration and any further post-polymerisation steps are effected continuously with the earlier steps in our process. Conveniently, the post-polymerisation may be effected by allowing the cut particles to gravitate down a heated tower in which an inert gas atmosphere is maintained at the desired temperature. Thus, in a typical polymerisation 4 minutes may be spent in the extruder, 10 minutes on the conveyor and the rest of the 40 minutes' total polymerisation time in the tower.

One way of carrying out our invention will now be described with reference to FIGURE 1 of the accompanying drawings which illustrates diagrammatically a suitable form of apparatus in which the polymer is disintegrated when it is in the non-tacky state but before it has become converted into equilibrium polymer.

Molten monomer and catalyst are fed separately into the stirred, heated storage vessel 1 and the resulting mixture is introduced by means of pump 2 on to the screw of extruder 3. Simultaneously a molten mixture of monomer and catalyst promoter from heated vessel 4 is pumped by pump 11 on to the extruder screw. Means for heating the extruder 3 and die 10 are not shown. A vent (not shown) is provided in the region of die 10 to allow gas to escape while the extruder barrel is being filled. The extrudate is removed from the die 10 by continuous moving band 5 around which inert gas is circulated by means of fan 6. The inert gas temperature is controlled by heat exchanger 7. A cutter 8 disintegrates the non-tacky polymer after it has left band 5 and the resulting particles gravitate down tower 9 in which the polymer is converted into the equilibrium state. A current of inert gas heated by heater 12 is forced by fan 13 up through tower 9. Provision is preferably made for removing monomer vapour from the inert gas stream in order to reduce condensation in colder parts of the system.

Examples of lactams which may be used in our invention are caprolactam, oenantholactam, capryllactam, dodecanolactam and their C-substituted derivatives such as $\alpha$-methyl caprolactam, $\beta,\delta$-dimethyl caprolactam and $\beta$-phenyl caprolactam. Of these we prefer caprolactam for economic reasons and for the very satisfactory properties of the product. Mixtures of lactams may be used, e.g. a mixture of caprolactam and capryllactam.

Suitable alkaline polymerisation catalysts which may be used are the alkali and alkaline earth metals (e.g. sodium, potassium, lithium, calcium, strontium, barium and magnesium) either in metallic form or in the form of hydrides, complex hydrides, amides, hydroxides, oxides, alkoxides and carbonates. When compounds which would give off water or a primary or secondary alcohol under the polymerisation conditions are used, all or substantially all of such water or alcohol should first be removed by passing an inert gas stream through the melt or applying reduced pressure, or both, and the purged melt introduced into the polymerisation region. Other effective alkaline catalysts that may be used are the organo-metallic derivatives of the above metals, e.g. lithium alkyls or aryls, and Grignard reagents, e.g. ethyl magnesium chloride, methyl magnesium bromide, phenyl magnesium bromide and the like. The alkaline catalyst may be used in concentrations ranging from about 0.01 to 10% preferably from 0.1 to 3% by weight of the lactam.

The promoters used in the process of the present invention may be selected from any of the classes of compounds which accelerate the alkaline polymerisation of lactams. Examples of such compounds are organic isocyanates such as ethyl isocyanate, p-phenylene diisocyanate and hexamethylene diisocyanate; acid chlorides such as acetyl chloride, benzoyl chloride and terephthalyl chloride; acid anhydrides such as maleic anhydride and phthalic anhydride; N-carboxyamino acid anhydrides such as glycine N-carboxyanhydride; amides such as acetanilide and N,N-diphenylformamide; sulphonamides such as N-methyl p-toluenesulphonanilide and N,N-diphenyl p-toluenesulphonamide. We prefer, however, that the promoter is selected from the class of compounds having the general formulae: R.X.C(:Z).Y.R′, where R and R′ each represent a hydrocarbon residue (as hereinafter defined) and each of X, Y and Z represents an oxygen atom, a sulphur atom or an —NR″— radical where R″ is a hydrocarbon residue or a hydrogen atom. By the term "hydrocarbon residue" is meant an alkyl, alkenyl, aryl, alkaryl, aralkyl or cycloalkyl group, R and R′ being linked together, if desired, to form a ring with atoms X, C and Y in the above formulae. We prefer that none of R, R′ and R″ should contain more than 18 carbon atoms and that the total number of carbon atoms in R, R′ and R″ combined should not be greater than 30. Examples of such compounds are carbonates such as dimethyl carbonate, diethyl carbonate, di-n-propyl carbonate, diisopropyl carbonate, di-n-butyl carbonate, di-t-butyl carbonate, methyl ethyl carbonate, ethyl n-propyl carbonate, methyl octyl carbonate, ethyl benzyl carbonate, diphenyl carbonate, phenyl benzyl carbonate, di-o-tolyl carbonate, dibenzyl carbonate, phenyl benzyl carbonate, di-o-tolyl carbonate, dibenzyl carbonate, n-propyl n-butyl carbonate, dicyclohexyl carbonate, ethyl cyclohexyl carbonate, tetramethylene carbonate, diallyl carbonate and dicrotyl carbonate; carbamates such as N-methyl ethyl carbamate, N-ethyl ethyl carbamate, N-ethyl methyl carbamate, N-octyl ethyl carbamate, N-ethyl phenyl carbamate, N-methyl benzyl carbamate, N-dodecyl ethyl carbamate, N-ethyl α-naphthyl carbamate, N-phenyl methyl carbamate, N-phenyl ethyl carbamate, N-α-naphthyl ethyl carbamate, N-β-naphthyl ethyl carbamate, N-phenyl cyclohexyl carbamate, N-o-tolyl methyl carbamate, N-phenyl phenyl carbamate, N-α-naphthyl phenyl carbamate, N-benzyl ethyl carbamate, N-benzyl phenyl carbamate, N-phenyl carbamate, and N-benzyl cyclohexyl carbamate; guanidines such as dimethyl guanidine, diethyl guanidine, di-n-propyl guanidine, diisopropyl guanidine, di-n-butyl guanidine, 1-methyl-3-ethyl guanidine, 1-ethyl-3-phenyl guanidine, diphenyl guanidine and dibenzyl guanidine; iminocarbonates such as diethyl iminocarbonate, di-n-propyl iminocarbonate, diphenyl iminocarbonate, dibenzyl iminocarbonate and dicyclohexyl iminocarbonate; ureas such as 1,3-dimethyl urea, 1-ethyl-3-phenyl urea, 1,3-ditolyl urea and tetramethylene urea; thioureas such as 1,3-dimethyl thiourea, 1,3-diphenyl thiourea and 1,3-dicyclohexyl thiourea; isoureas such as O-methyl-N-phenyl isourea, O-ethyl-N-phenyl isourea and O-ethyl-N-o-tolyl isourea; xanthates such as ethyl S-ethyl xanthate and ethyl S-butyl xanthate; thiolcarbamates such as N-ethyl S-ethyl thiolcarbamate, N-phenyl S-methyl thiolcarbamate and N-phenyl S-phenyl thiolcarbamate; dithiocarbamates such as N-phenyl ethyl dithiocarbamate and N-ethyl n-butyl dithiocarbamate; isothioureas such as N-ethyl-S-phenyl isothiourea, N-isopropyl-S-benzyl isothiourea and N-cyclopentyl-S-butyl isothiourea; thioncarbamates such as N-phenyl O-methyl thioncarbamate, N-phenyl O-cyclohexyl thioncarbamate and N-allyl O-ethyl thioncarbamate; thiolcarbonates such as S-ethyl ethyl thiolcarbonate; dithiolcarbonates such as dimethyl dithiolcarbonate and diethyl dithiolcarbonate; and trithiocarbonates such as diethyl trithiocarbonate.

Suitable amounts of promoters that may be used in our process range from about 0.001 to 5%, preferably from 0.05 to 1%, by weight of the lactam. The addition of promoter, optionally in admixture with lactam, should preferably be made to the mixture of lactam and alkaline catalyst on or immediately above the screw of the extruder in order to avoid any substantial pre-polymerisation.

*Example*

Two melts were prepared, melt A comprising caprolactam (10,000 parts by weight) and sodium metal (82 parts by weight, ca. 4 moles percent) and melt B comprising caprolactam (10,000 parts by weight) and diethyl carbonate (126 parts by weight, ca. 1.2 moles percent), A being maintained at 100° C. and B at 80° C.

A horizontal single-screw extruder was modified by filling up the dead space in the steam-heated feed pocket by a block containing the two monomer feed pipes which discharged separately within 0.010 inch of the screw flights in a plane at right angles to the screw axis. One of the feed pipes was fitted with a colour injector for determination of dwell time.

The valved and vented die was vertical and was fitted with a temperature indicator to record the temperature of the polymer melt in the die head.

The extruder barrel was heated by four cuff heaters, the temperatures (reading in the direction of the die) being respectively 245, 265, 265 and 250° C. Provision was also made for air cooling if required.

With the die valve closed and the vent open, the gear pumps (coupled by a common driving shaft and fitted with return loops controlled by pressure relief valves) were started to supply monomer melts A and B at a delivery pressure (set by the pressure relief valves) of 5 p.s.i.

All feed and transfer pipes were electrically heated to prevent solidification of the monomer.

After emergence of liquid from the vent, the vent was closed, and the screw stopped. Four minutes after stopping the die valve was opened and the drive was restarted at its former rate. The polymer formed was extruded in lace form. The die pressure developed was 40 p.s.i.

The extrudate was then carried on a steel band conveyor (20 ft. long, travelling at 1.5 ft. per minute) surrounded by a cooling stream of nitrogen (inlet temperature 155° C., temperature over cooling section of conveyor 160° C., outlet temperature 165° C.).

About 15 minutes after leaving the die the extrudate, which was now opaque and non-tacky, passed through nip rolls and entered the lace cutter mounted on top of a post-polymerisation tower having capacity for a maximum hold up of half an hour, where it was maintained at a temperature of 160° C., being delivered at a rate of 2 lbs./hr. from the foot of the tower by a rotary valve. The polymer obtained had a monomer content of 0.40% by weight, and was eminently suitable for extrusion and injection moulding applications.

The above describes a typical run. Details of the variation in viscosity with dwell time for three different catalyst compositions are given in FIGURES 2, 3 and 4, FIGURE 2 referring to the run described above.

Figure 2:
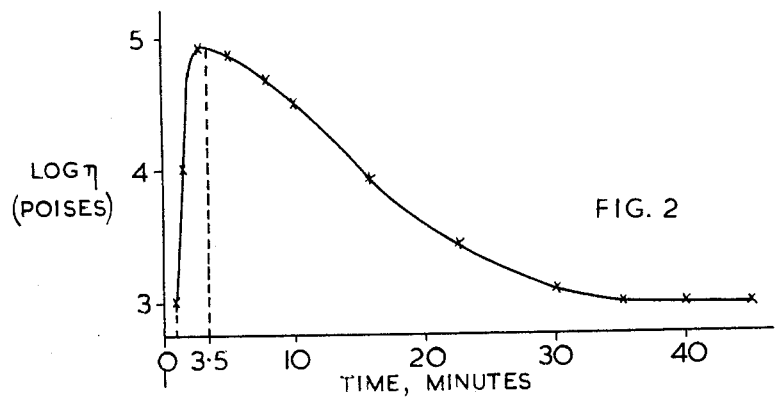
Figure 3:
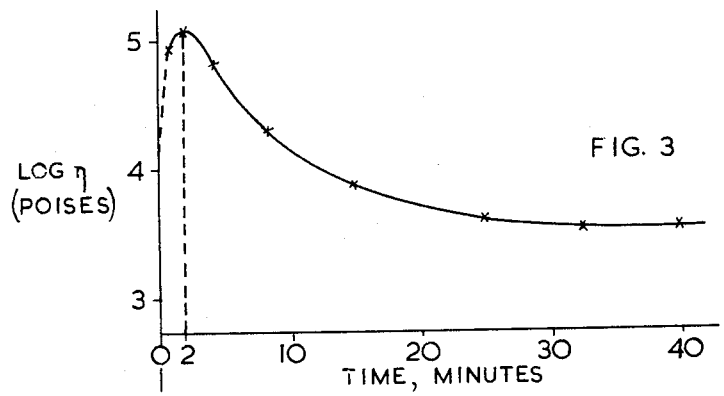
Figure 4:
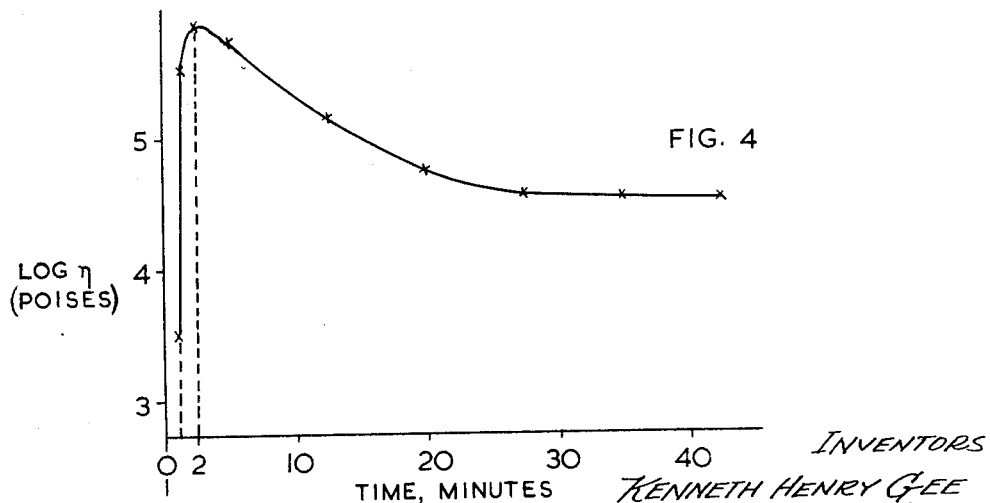

| | Na (moles percent) | Diethyl Carbonate (moles percent) | Monomer Content (percent by weight) |
|---|---|---|---|
| FIGURE 2 | 2 | 0.6 | 0.40 |
| FIGURE 3 | 1 | 1 | 0.35 |
| FIGURE 4 | 0.5 | 1 | 0.52 |

We claim:

1. A continuous process for the production of polyamides which comprises heating in a first zone a mixture (1) containing at least one monomeric lactam of a monoamino monocarboxylic acid, said lactam containing at least six carbon atoms in the lactam ring, an alkaline polymerisation catalyst and a catalyst promoter, to a temperature above the melting point of the polyamide, said mixture (1), in the course of heating to elevated temperatures, undergoing a reaction in which the viscosity increases to a maximum and then decreases on continued heating, continually advancing said mixture (1) through said first zone, the rate of advancement of the mixture being such that, when it reaches the end of said first zone, it becomes a mixture (2), the viscosity ($\eta$) of the mixture (2) being given by the formula:

$$\log_{10}\eta \nless [\log_{10}(\eta\max.)] - 0.5$$

where ($\eta$max.) is said maximum viscosity, transferring said mixture (2) from the end of said first zone to a second zone, cooling the mixture (2) as it enters said second zone to a temperature below said melting point of said polyamide and maintaining the mixture (2) in said second zone at a temperature that is between 60° and 15° C. below said melting point of said polyamide at least until the onset of opacity in the mixture (2).

2. A process according to claim 1 in which a molten mixture (1) of said monomeric lactam with alkaline polymerisation catalyst and a catalyst promoter is introduced into a said first zone which terminates in a restricted orifice, heat is applied to said mixture (1) in said first zone and said orifice whereby its temperature is raised above the melting point of the polyamide, and the polymeric product thereby obtained is removed from said orifice when its viscosity ($\eta$) is of a value given by the formula: $\log_{10}\eta \not< [\log_{10}(\eta max.)] - 0.5$ where ($\eta$max.) is said maximum viscosity.

3. A process according to claim 1 in which the temperature of the mixture (2) when it is transferred from said first zone to said second zone is from 230 to 280° C.

4. A process according to claim 1 in which the mixture (2) transferred to said second zone is cooled with an inert fluid maintained at a temperature lower than the melting point of the polyamide.

5. A process according to claim 1 in which the cooled mixture (2) transferred to said second zone is maintained at a temperature of from 25 to 45° C. below the melting point of the polymer.

6. A process according to claim 1 in which the cooled mixture (2) transferred to said second zone is maintained at a temperature that is between 60° and 15° C. below the melting point of the polyamide until the resulting polyamide has a residual monomer content of less than 1% by weight of the polyamide.

7. A process according to claim 1 in which the dwell time in said first zone does not exceed 20% of the total time required to reduce the residual monomer content of the polyamide to less than 1% by weight of the polyamide.

8. A process according to claim 1 in which the dwell time in said first zone does not exceed 10% of the total time required to reduce the residual monomer content of the polyamide to less than 1% by weight of the polyamide.

References Cited by the Examiner

UNITED STATES PATENTS

| | | | |
|---|---|---|---|
| 2,687,552 | 8/1954 | Gabler | 260—78 |
| 2,731,081 | 1/1956 | Mayner | 260—78 |
| 2,907,755 | 10/1959 | Lautenschlager et al. | 260—78 |
| 3,015,652 | 1/1962 | Schnell et al. | 260—78 |
| 3,017,391 | 1/1962 | Mothers et al. | 260—78 |
| 3,018,273 | 1/1962 | Butler et al. | 260—78 |

WILLIAM H. SHORT, *Primary Examiner.*

JOSEPH R. LIBERMAN, HAROLD D. ANDERSON, *Assistant Examiners.*